US012770946B2

(12) United States Patent
Matsushima et al.

(10) Patent No.: US 12,770,946 B2
(45) Date of Patent: Oct. 20, 2026

(54) MOUNTING STRUCTURE OF TEMPERATURE SENSOR

(71) Applicant: Yazaki Corporation, Tokyo (JP)

(72) Inventors: Tomohiro Matsushima, Shizuoka (JP); Yasuhiro Sugimori, Shizuoka (JP); Hiraku Tanaka, Shizuoka (JP); Akinori Sakamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 867 days.

(21) Appl. No.: 16/458,849

(22) Filed: Jul. 1, 2019

(65) Prior Publication Data

US 2020/0014083 A1 Jan. 9, 2020

(30) Foreign Application Priority Data

Jul. 6, 2018 (JP) ................................ 2018-128690
Apr. 4, 2019 (JP) ................................ 2019-071959

(51) Int. Cl.
*H01M 10/48* (2006.01)
*B60L 50/60* (2019.01)
(Continued)

(52) U.S. Cl.
CPC ........... *H01M 10/486* (2013.01); *B60L 50/64* (2019.02); *B60L 50/66* (2019.02); *H01M 10/482* (2013.01);
(Continued)

(58) Field of Classification Search
CPC .. H01M 10/486; H01M 50/20; H01M 10/482; B60L 50/64; B60L 50/66
(Continued)

(56) References Cited

U.S. PATENT DOCUMENTS

2017/0268935 A1 9/2017 Hua
2018/0045577 A1 2/2018 Sun
(Continued)

FOREIGN PATENT DOCUMENTS

CN 107078244 A * 8/2017 ........ H01M 10/0525
JP 0974686 A * 3/1997 ............ H01M 10/46
(Continued)

OTHER PUBLICATIONS

Takada (translation) (Year: 2017).*
(Continued)

*Primary Examiner* — Tiffany Legette
*Assistant Examiner* — Paul Christian St Wyrough
(74) *Attorney, Agent, or Firm* — Sughrue Mion, PLLC

(57) ABSTRACT

A mounting structure of a temperature sensor is configured to detect temperature of a battery cell included in a battery pack having a plurality of battery cells being connected by mounting on the battery cell. The mounting structure includes a flexible thin plate-like electric-wire including a conductor exposed part where the conductor is exposed, a chip-shaped temperature measuring component mounted on the conductor exposed part, a resin case arranged on a periphery of the conductor exposed part and surrounding the temperature measuring component, and a moisture-proof material coating the temperature measuring component arranged in the resin case.

15 Claims, 14 Drawing Sheets

(51) Int. Cl.
*B60L 50/64* (2019.01)
*H01M 50/204* (2021.01)
*H01M 50/262* (2021.01)

(52) U.S. Cl.
CPC ....... *H01M 50/204* (2021.01); *H01M 50/262* (2021.01)

(58) Field of Classification Search
USPC .......................................................... 374/208
See application file for complete search history.

(56) References Cited

U.S. PATENT DOCUMENTS

| | | | |
|---|---|---|---|
| 2018/0219204 A1 | 8/2018 | Takase et al. | |
| 2019/0178723 A1 | 6/2019 | Yanagida et al. | |
| 2020/0049572 A1 | 2/2020 | Hua | |

FOREIGN PATENT DOCUMENTS

| | | | | | |
|---|---|---|---|---|---|
| JP | 2005-43211 A | | 2/2005 | | |
| JP | 2011-227000 A | | 11/2011 | | |
| JP | 5611071 B2 | * | 10/2014 | | |
| JP | 2015-069738 A | | 4/2015 | | |
| JP | 2016-3937 A | | 1/2016 | | |
| JP | 2016050882 A | * | 4/2016 | | |
| JP | 2017-027831 A | | 2/2017 | | |
| JP | 2017-525979 A | | 9/2017 | | |
| JP | 2017-227555 A | | 12/2017 | | |
| JP | 2018-66723 A | | 4/2018 | | |
| KR | 101450891 B1 | * | 10/2014 | | |
| KR | 2016023109 A | * | 3/2016 | ............... | G06F 1/16 |

OTHER PUBLICATIONS

Tsueno (translation) (Year: 1997).*
Hiroyuki machine translation (Year: 2014).*
JP5611071B2 (machine translation) (Year: 2014).*
KR-2016023109-A (machine translation) (Year: 2016).*
JP-2016050882-A (machine translation) (Year: 2016).*

* cited by examiner

MOUNTING STRUCTURE OF TEMPERATURE SENSOR

CROSS REFERENCE TO RELATED APPLICATION

This application is based upon and claims the benefit of priority from the prior Japanese Patent Application No. 2019-071959, filed on Apr. 4, 2019, and Japanese Patent Application No. 2018-128690, filed on Jul. 6, 2018, the entire contents of which are incorporated herein by reference.

BACKGROUND

Technical Field

The disclosure relates to a mounting structure of a temperature sensor configured to detect temperature of a battery cell included in a battery pack.

Related Art

A mounting structure of a temperature sensor for detecting temperature of a battery cell included in a battery pack being mounted on a vehicle such as an electric vehicle or a hybrid-electric vehicle or the like and used as a driving source is disclosed in JP 2015-69738 A.

The mounting structure of the temperature sensor described in JP 2015-69738 A is a contact structure that contacts a single battery cell of the battery pack and detects the temperature with the temperature sensor. The temperature sensor includes at least a substrate having a lower surface made of metal and a conductive path formed on the upper surface, and a chip type temperature measuring component soldered to the conductive path of the substrate.

In the mounting structure of the temperature sensor, the temperature sensor is pushed downward by an elastic member or the like to bring the substrate of the temperature sensor soldered with at least the temperature measuring component into contact with the top surface of the battery cell.

However, in such a mounting structure of the temperature sensor, each core wire of two coated electric wires is connected by soldering to a conductive path formed on the upper surface of the substrate, which is the conductive path soldered to the temperature measuring component, and the connected part was coated with moisture-proof material or potting material. Accordingly, the size of the substrate is large, and the entire mounting structure including the substrate is large and thick. Therefore, restrictions may occur when mounting the temperature sensor onto a battery cell.

JP 2017-27831 A discloses a battery wiring module in which a current limiting component is soldered to a voltage detection line of a flexible printed circuit (FPC) and an insulating resin material is applied to cover the current limiting component. However, the configuration of such a battery wiring module has not described a configuration that can restrict the spread of the applied insulating resin material. Therefore, the battery wiring module of JP 2017-27831 A is not easy to achieve reduction in thickness, size and weight.

SUMMARY

An object of the present invention is to provide amounting structure of a temperature sensor that can be made thin, compact and lightweight, and capable of mounting onto a battery cell side with a small space.

A mounting structure of a temperature sensor according to an embodiment is configured to detect temperature of a battery cell included in a battery pack having a plurality of battery cells being connected by mounting on the battery cell. The mounting structure includes a flexible thin plate-like electric-wire including a conductor exposed part where the conductor is exposed, a chip-shaped temperature measuring component mounted on the conductor exposed part, a resin case arranged on a periphery of the conductor exposed part and surrounding the temperature measuring component, and a moisture-proof material coating the temperature measuring component arranged in the resin case.

The above configuration provides a mounting structure of a temperature sensor that can be made thin, compact and lightweight, and capable of mounting onto a battery cell side with a small space by using a flexible thin plate-like electric-wire as an electric wire and by coating the temperature measuring component with moisture-proof material in a resin case surrounding the temperature measuring component mounted on the conductor exposed part of the flexible thin plate-like electric-wire.

DETAILED DESCRIPTION

Figure 1:
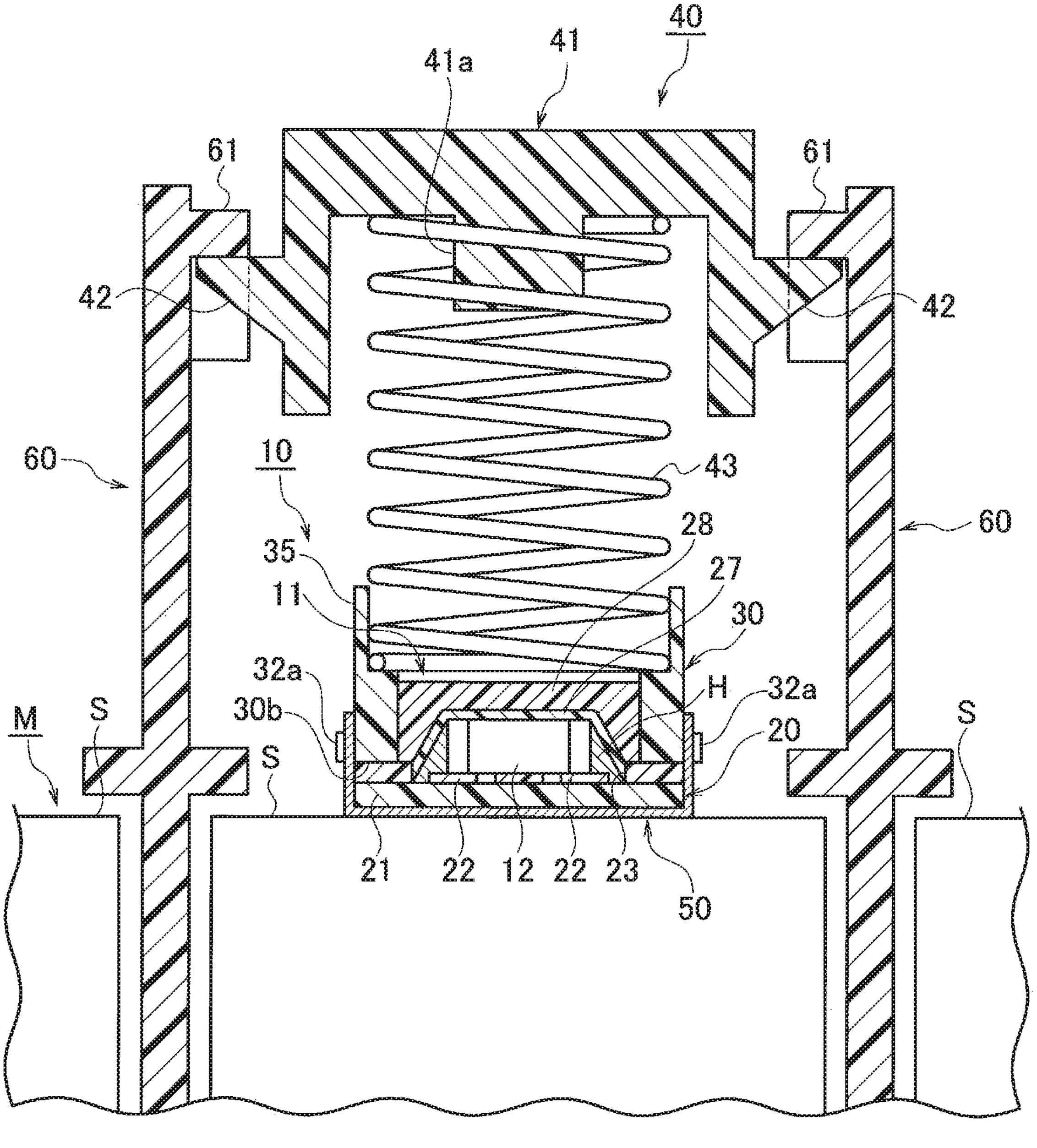
FIG. 1 is a side view including a partial sectional view of a mounting structure of a temperature sensor according to a first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be herein below provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2A:
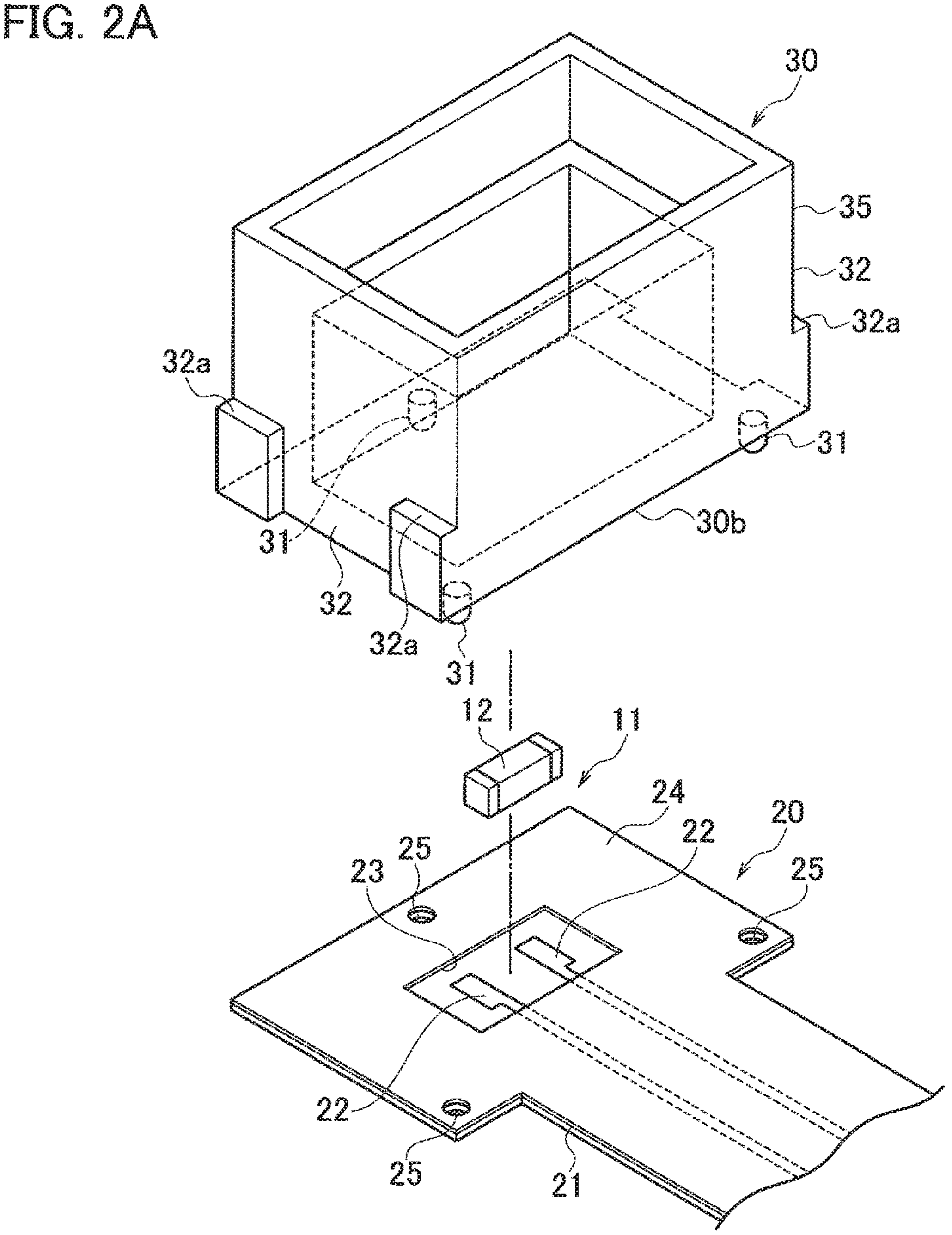
FIG. 2A is a perspective view illustrating a state before assembling the temperature sensor.
Figure 2B:
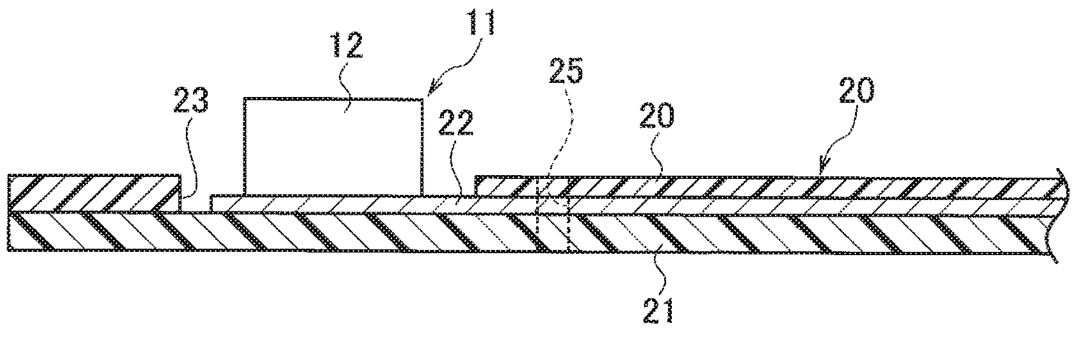
FIG. 2B is a cross-sectional view illustrating a temperature measuring component mounted on a flexible printed wiring board of the temperature sensor.
Figure 3:
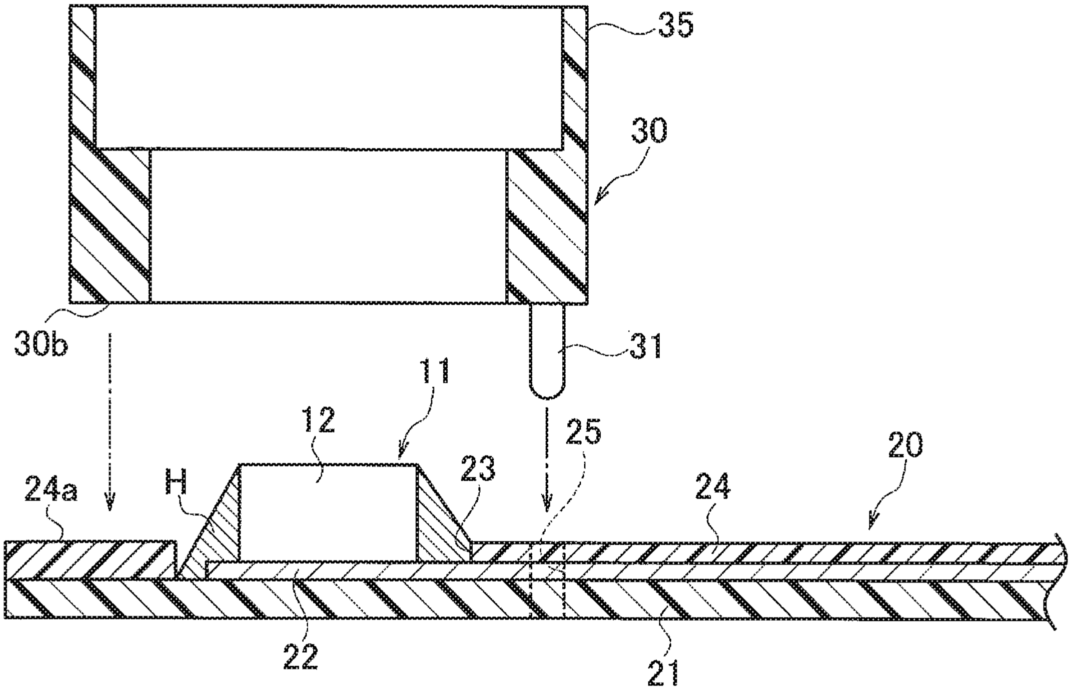
FIG. 3 is a cross-sectional view illustrating a state before securing a resin case arranged on a periphery of the temperature measuring component of the flexible printed wiring board.
Figure 4:
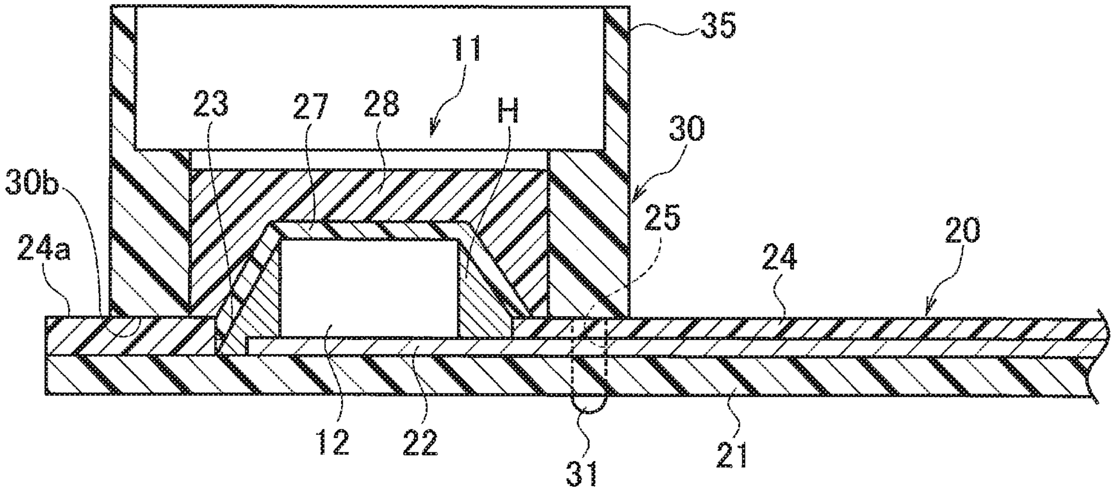
FIG. 4 is a cross-sectional view illustrating a state in which an adhesive such as moisture-proof material is filled in the resin case, the resin case which is fixed to the flexible printed wiring board.
Figure 5:
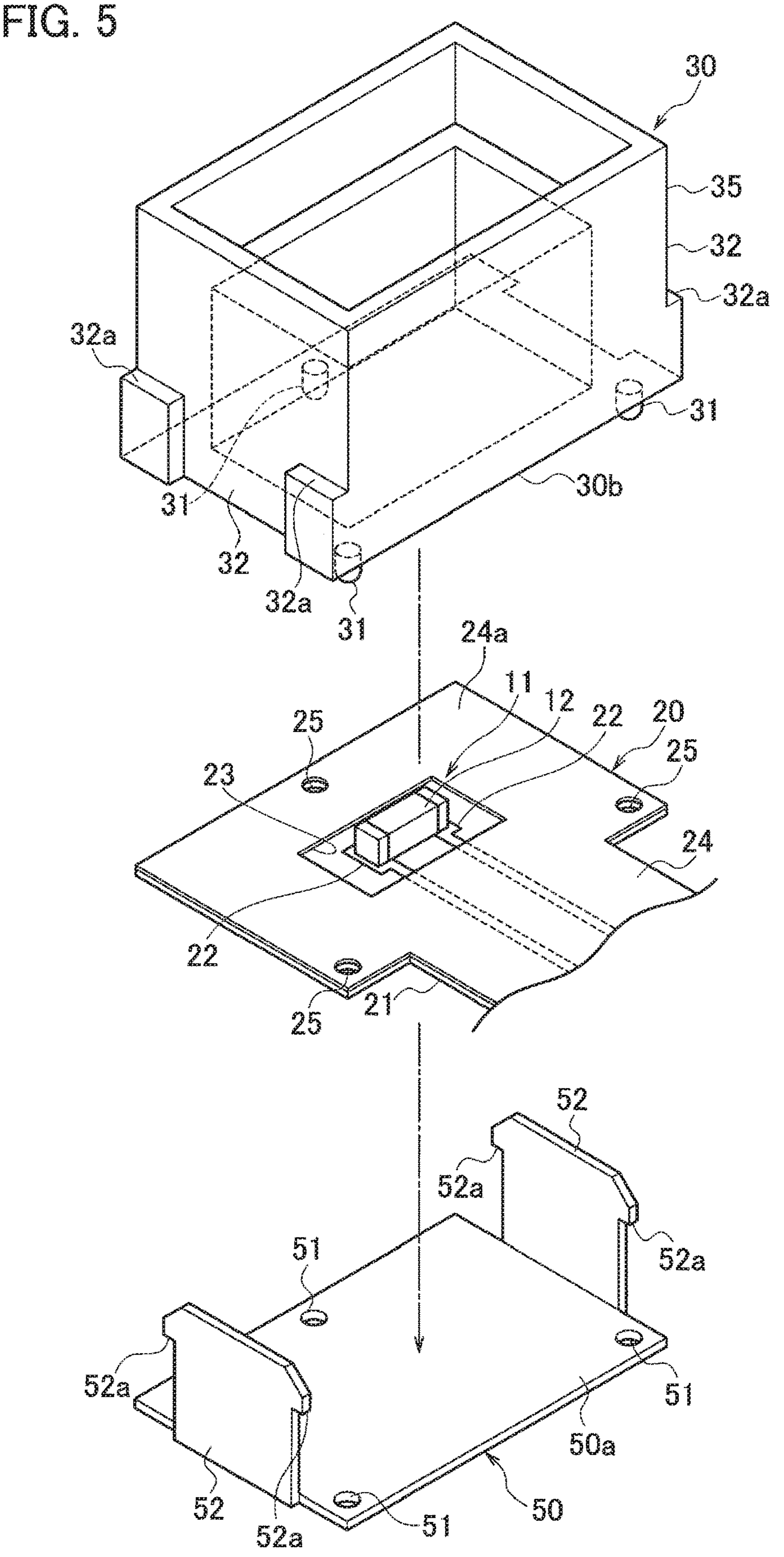
FIG. 5 is a perspective view illustrating the main part of the temperature sensor before being assembled.
Figure 6:
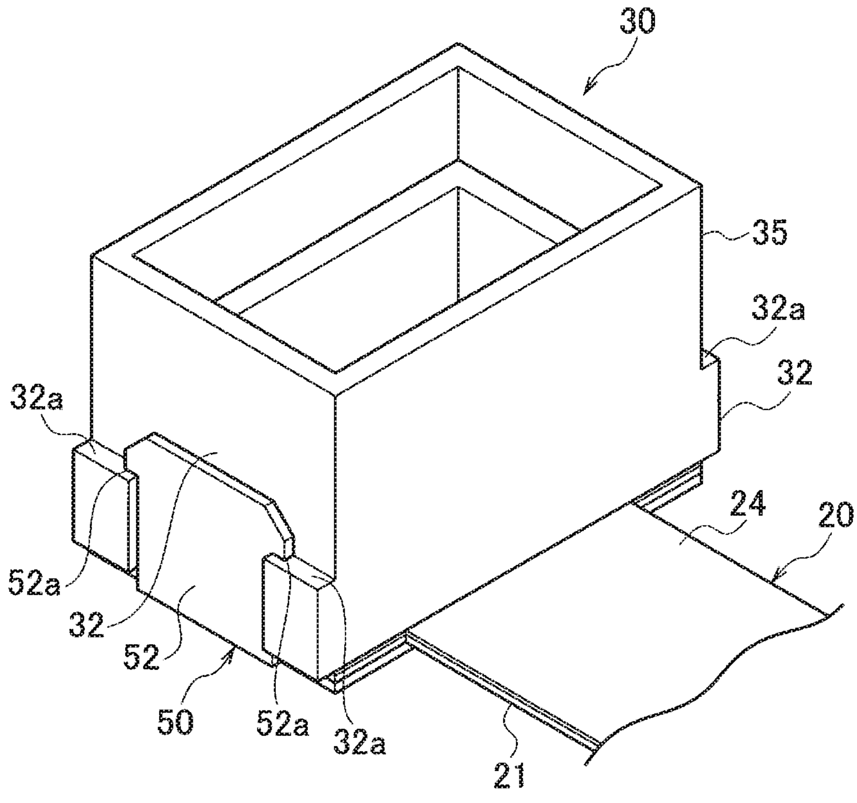
FIG. 6 is a perspective view illustrating the main part of the temperature sensor after being assembled.

FIG. 1 is a side view including a partial sectional view of a mounting structure of a temperature sensor according to a first embodiment; FIG. 2A is a perspective view illustrating a state before assembling the temperature sensor; FIG. 2B is a cross-sectional view illustrating a temperature measuring component mounted on a flexible printed wiring board of the temperature sensor; FIG. 3 is a cross-sectional view illustrating a state before securing a resin case arranged on a periphery of the temperature measuring component of the flexible printed wiring board; FIG. 4 is a cross-sectional view illustrating a state in which an adhesive such as moisture-proof material is filled in the resin case, the resin case which is fixed to the flexible printed wiring board; FIG. 5 is a perspective view illustrating the main part of the temperature sensor before being assembled; and FIG. 6 is a perspective view illustrating the main part of the temperature sensor after being assembled.

As illustrated in FIG. 1, the mounting structure 10 of the temperature sensor 11 is attached to a flexible thin plate-like electric-wire 20; and temperature of a battery cell S included in a battery pack (Battery Module) M in which a plurality of battery cells S, such as lithium batteries, are connected in series or in parallel is detected by the temperature sensor 11. The mounting structure 10 of temperature sensor 11 includes a flexible printed wiring board 20 as a flexible thin plate-like electric-wire, a chip NTC thermistor (Chip-shaped temperature measuring component) 12 soldered (illustrated as reference sign H in FIG. 1) to an exposed part 23 of wiring patterns 22 on the flexible printed wiring board 20 to detect the temperature of a battery cell S, and a resin case 30, which is made of synthetic resin and having a rectangular cylindrical structure, arranged on a periphery of the exposed part 23 of the wiring patterns 22 on the flexible printed wiring board 20.

As illustrated in FIGS. 2A to 4, the flexible printed wiring board 20 is manufactured by forming two wiring patterns (conductors) 22 in parallel with a conductive metal such as copper foil on an insulating thin flexible base film 21 such as polyimide, and insulating the surface of the base film 21 by adhering a film-like cover 24 such as polyimide except for a part above the exposed part 23 of the wiring patterns 22.

As shown in FIGS. 1 and 2B, the chip NTC thermistor 12 is soldered and mounted (this part is indicated by a symbol H in the drawings) on the exposed part 23 of the two wiring patterns 22 so as to straddle the two wiring patterns 22 on the exposed portion 23. Further, as illustrated in FIGS. 3, 5, and 6, a rectangular cylindrical case 30 made of a synthetic resin is placed on the surface 24*a* on the periphery of the part where the chip NTC thermistor 12 of the flexible printed wiring board 20 is mounted. The rectangular cylindrical case 30 is fixed to the flexible printed wiring board 20 by sandwiching the flexible printed wiring board 20 between a bottom surface 30*b* of the case 30 surrounding the part of flexible printed wiring board 20 where NTC thermistor 12 is mounted and a surface of a support member 50 configured to be locked to the case 30. When fixing the rectangular cylindrical case 30 onto the flexible printed wiring board 20, the rectangular cylindrical case 30 is arranged on the flexible printed wiring board 20 by inserting a plurality of positioning pins 31 protruding from the bottom surface 30*b* through a plurality of positioning holes 25 formed on the flexible printed wiring board 20 and a plurality of positioning holes 51 formed on the support member 50. Further, Lock protrusions 32*a* protruding from both side walls 32 of the case 30 protruding as a pair at both ends of each side walls 32 is locked with hook-shaped lock receiving portion 52*a* formed on the support member 50 at both side of each side pieces 52 formed by bending both ends of the rectangular surface 50*a* of the support member 50.

As illustrated in FIG. 4, the mounting structure 10 of the temperature sensor 11 further comprises a moisture-proof material 27 for coating the chip NTC thermistor 12 in the rectangular cylindrical case 30 made of synthetic resin. On the top of the moisture-proof material 27, an adhesive 28 as a resin material is filled into the case 30. In this configuration, the moisture-proof material 27 and the adhesive can be reliably injected from the upper side of the rectangular cylindrical case 30 placed on the surface surrounding the part where the chip NTC thermistor 12 of the flexible printed wiring board 20 is mounted. Furthermore, since the moisture-proof material 27 and the adhesive 28 are injected after being surrounded by the rectangular cylindrical case 30, the spread of the moisture-proof material 27 and the adhesive 28 can be surely regulated.

As illustrated in FIG. 1, the rectangular cylindrical case 30 made of the synthetic resin of the temperature sensor 11 is biased toward the battery cell S side by a biasing unit 40 and is in contact with the battery cell S at a part of the flexible printed wiring board 20 where the chip NTC thermistor 12 is mounted.

The biasing unit 40 includes a spring retainer (elastic member retainer) 41 made of synthetic resin configured to engaging or disengaging the respective engage part 42 with respective lock receiving portion 61 having an inverse-concave-shaped formed to face each other on a holder 60 on the battery cell S side, and a compression coil spring (elastic member) 43 which is held by the spring retainer 41 and press-biases the rectangular cylindrical case 30 made of a synthetic resin toward the battery cell S side.

The battery pack M is a battery pack mounted on a vehicle such as an electric vehicle (EV), a hybrid electric vehicle (HEV) or a plug-in hybrid electric vehicle (PHEV) or the like and is used as a drive source. Further, the compression coil spring 43 is held by the holding shaft part 41*a* of the spring retainer 41 so as not to come off. Moreover, a box-like spring accommodating and holding part 35 is integrally molded on the upper surface of the case 30.

As described above, the mounting structure 10 of the temperature sensor 11 according to the first embodiment is capable of making the entire mounting structure to be thin, compact, and lightweight, and can be mounted onto the battery cell S to detect temperature with space saving, since the flexible printed wiring board (FPC) 20 is employed as the voltage detection line (electric wire) connected to a battery monitoring unit (not shown) that monitors the voltage of the battery cell S of the battery pack M and since the chip NTC thermistor 12 is coated and/or laminated with the moisture-proof material 27 and the adhesive 28 in the rectangular cylindrical case 30 made of synthetic resin surrounding the chip NTC thermistor 12 soldered on the exposed part 23 of the wiring pattern 22 of the flexible printed wiring board (FPC) 20.

When the flexible printed wiring board 20 is connected to the battery monitoring unit, the wiring pattern 22 of the flexible printed wiring board 20 can be connected to the battery monitoring unit. Therefore, a connector for connecting with coated electric wire is not necessary. Accordingly, cost reduction can be achieved by reducing the number of components.

The temperature sensor 11 made compact and thin is capable of minimizing its contact area and can reduce its heat capacity, since the temperature sensor 11 is pressed downward via the rectangular cylindrical case 30 made of synthetic resin and contacts the upper surface of the battery cell S by the elastic force of the compression coil spring 43 held by the spring retainer 41 that locks the lock part 42 to the lock receiving portion 61 of the holder 60 on the battery cell S. Thereby, a heat capacity can be reduced, and temperature measurement performance can be improved.

Furthermore, by using the chip NTC thermistor 12 mounted by soldering on the wiring pattern 22 exposed at the conductor exposed part 23 of the flexible printed wiring board 20, it is possible to easily secure improvement in the temperature measurement performance and insulation. In particular, the moisture-proof material 27 or the adhesive resin material 28 can be applied or filled in a leak-proof manner and can easily and reliably prevent the moisture-proof material 27 and the adhesive resin material 28 from spreading, since the rectangular cylindrical case 30 made of synthetic resin fixed via the support member 50 is arranged to surround the soldered part H of the chip NTC thermistor 12. Thereby, the periphery of the soldered portion H of the chip NTC thermistor 12 can be sealed to ensure insulation.

Figure 7:
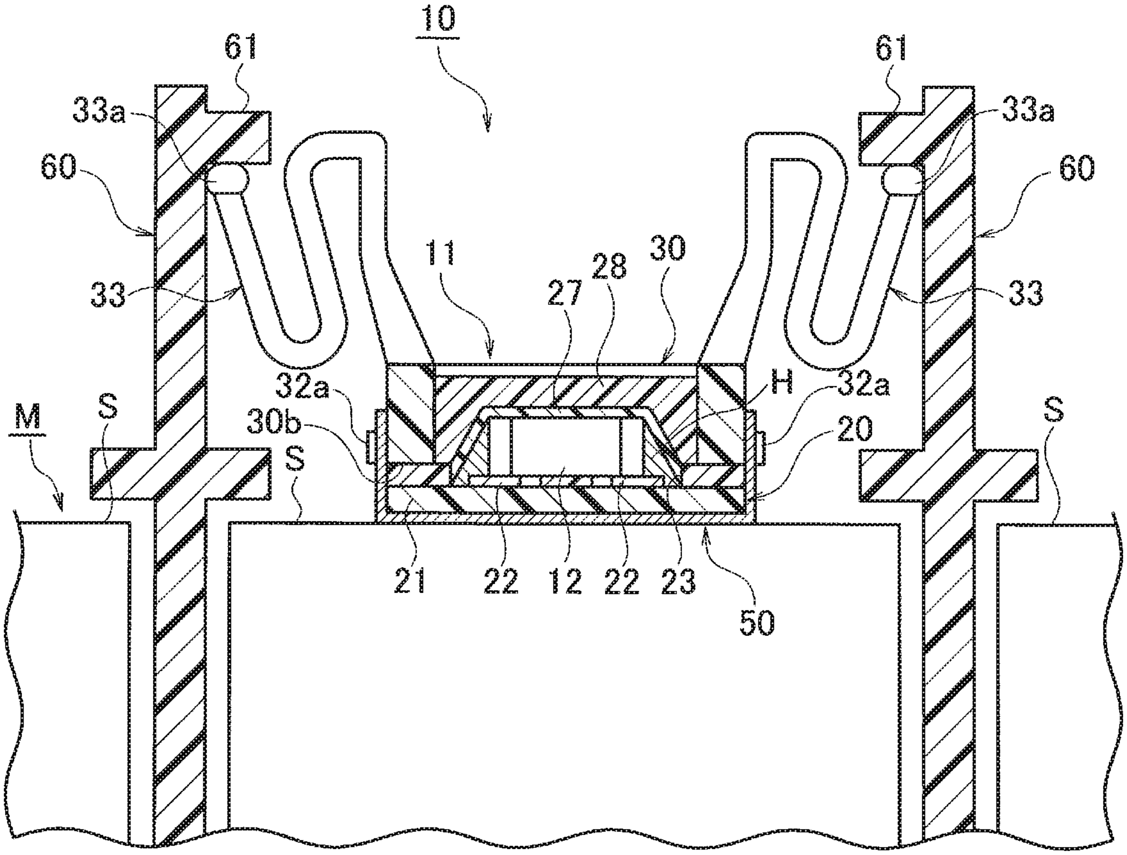
FIG. 7 is a side view including a partial sectional view of a mounting structure of a temperature sensor according to a second embodiment.
Figure 8:
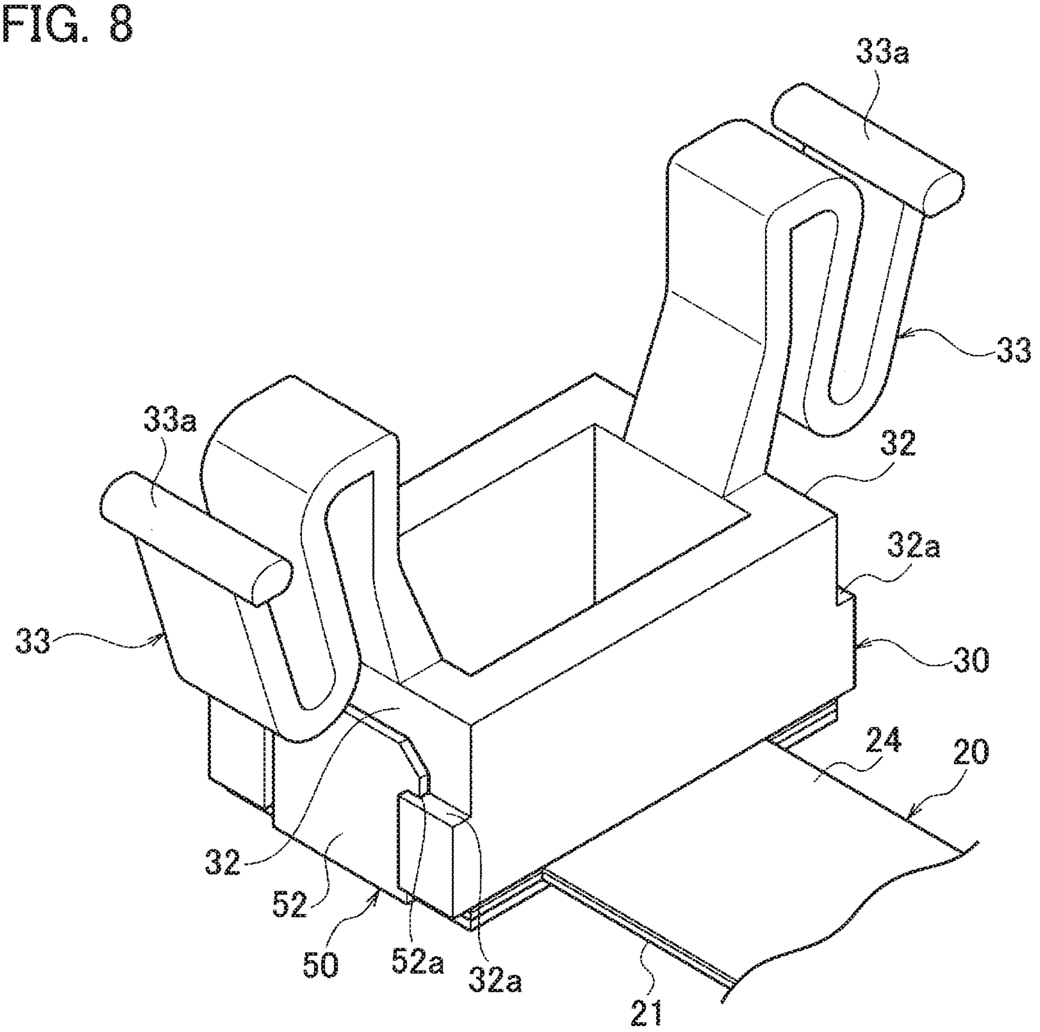
FIG. 8 is a perspective view illustrating a state before assembling the temperature sensor according to the second embodiment.

FIG. 7 is a side view including a partial sectional view of a mounting structure of a temperature sensor according to a second embodiment; and FIG. 8 is a perspective view illustrating a state before assembling the temperature sensor according to the second embodiment.

The mounting structure 10 of the temperature sensor 11 according to a second embodiment is different from the mounting structure of the first embodiment in that a pair of arm-like elastic parts (elastic members) 33 engaged with the respective lock receiving portions 61 of the pair of holding members 60 are formed to protrude from the upper surface of a pair of side wall parts 32 of the case 30 as a single piece. Since the other configurations are the same as that of the first embodiment, the same components are denoted with the same reference numerals and the detailed description will be omitted.

In the mounting structure 10 of the temperature sensor 11 of the second embodiment, distal end portions of the pair of arm-like elastic parts 33 formed of the case 30 are engaged with the lock receiving portion 61 of the holder 60, whereby the case 30 is pressed to the battery cell S side by the bending deformation of the arm-like elastic parts 33 and a part of the flexible printed wiring board 20, where the chip NTC thermistor 12 is mounted, contacts the battery cell S. Thereby, the same operation and effect as the first embodiment can be obtained.

Further, since the arm-like elastic parts 33 of the case 30 has a function as an elastic member, the number of components is reduced accordingly, and cost reduction can be achieved. Furthermore, since the case 30 has both the effects of fixing the flexible printed wiring board 20 and restricting the spread of the moisture-proof material 27 and the adhesive 28, the part of the flexible printed wiring board 20 where the chip NTC thermistor 12 is mounted can be reduced in size and thickness.

Figure 9:
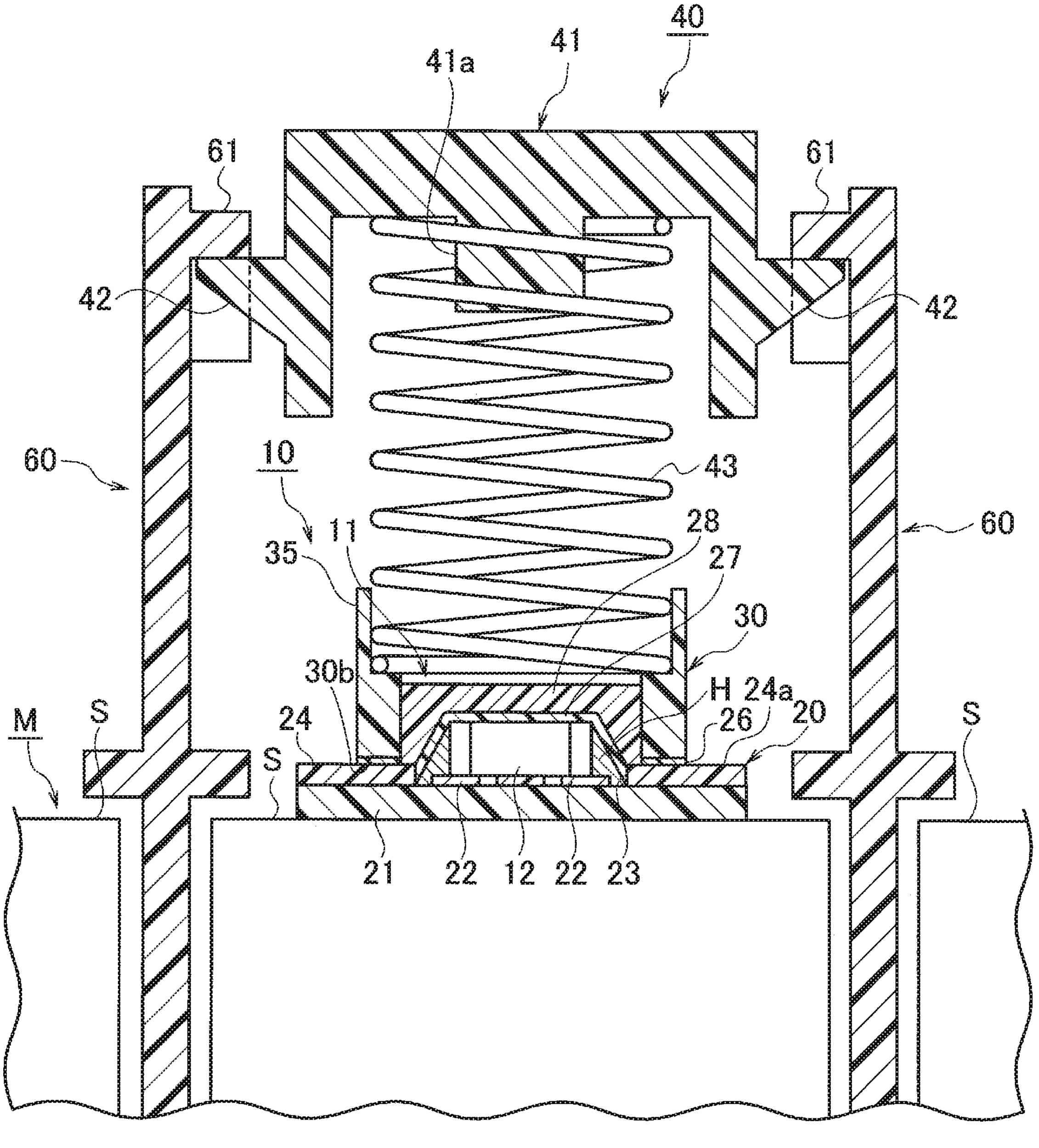
FIG. 9 is a side view including a partial sectional view of a mounting structure of a temperature sensor according to a third embodiment.
Figure 10A:
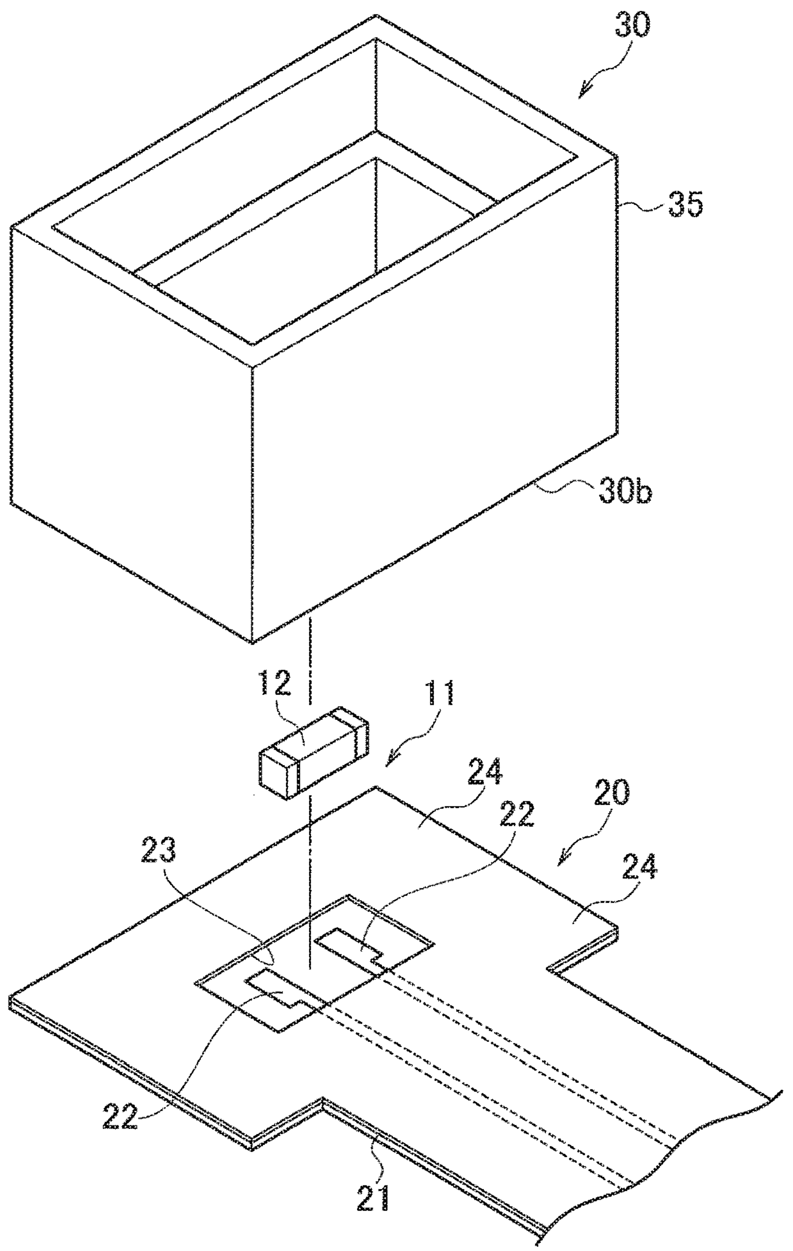
FIG. 10A is a perspective view illustrating a state before assembling the temperature sensor according to the third embodiment.
Figure 10B:
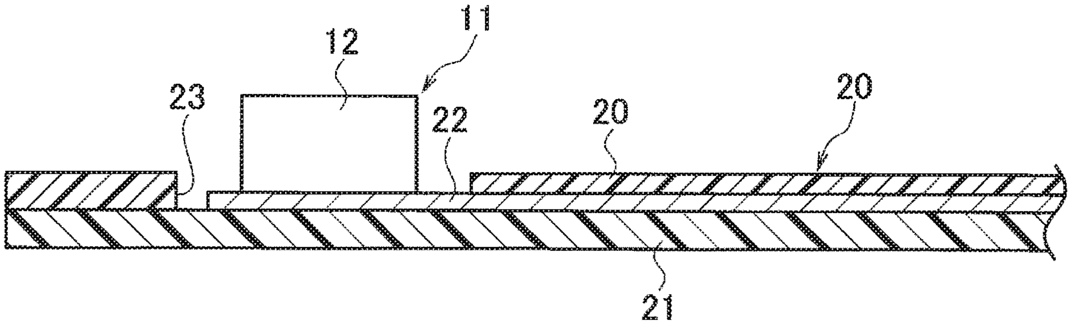
FIG. 10B is a cross-sectional view illustrating a state after assembling the temperature sensor according to the third embodiment.
Figure 11:
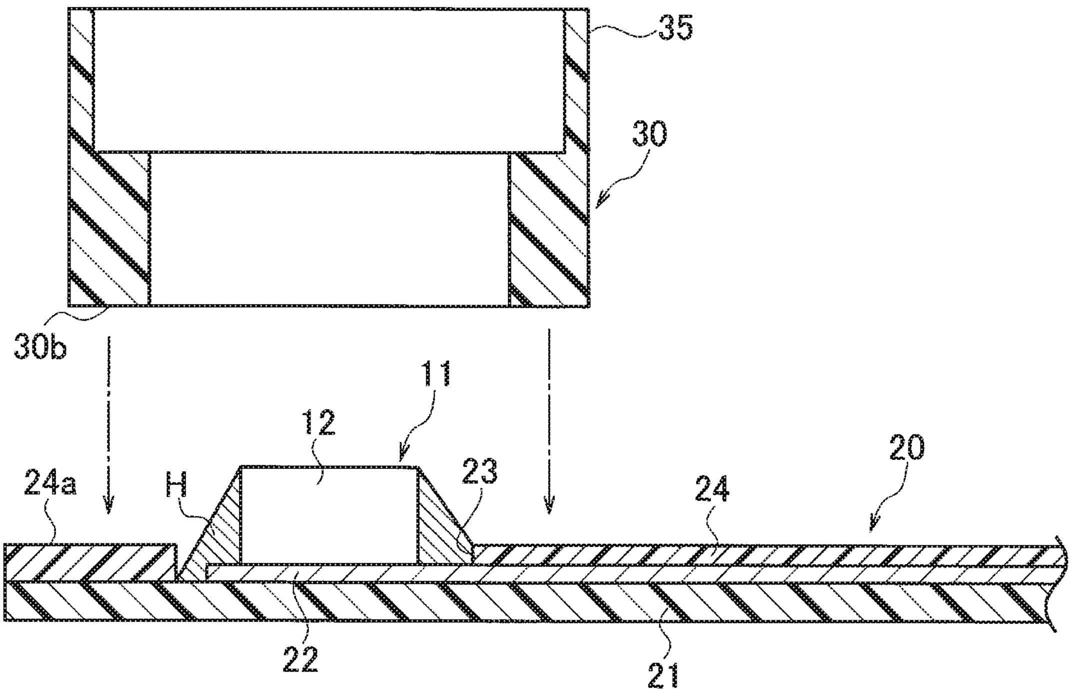
FIG. 11 is a cross-sectional view illustrating a state before securing a resin case arranged on a periphery of the temperature measuring component of the flexible printed wiring board according to the third embodiment.
Figure 12:
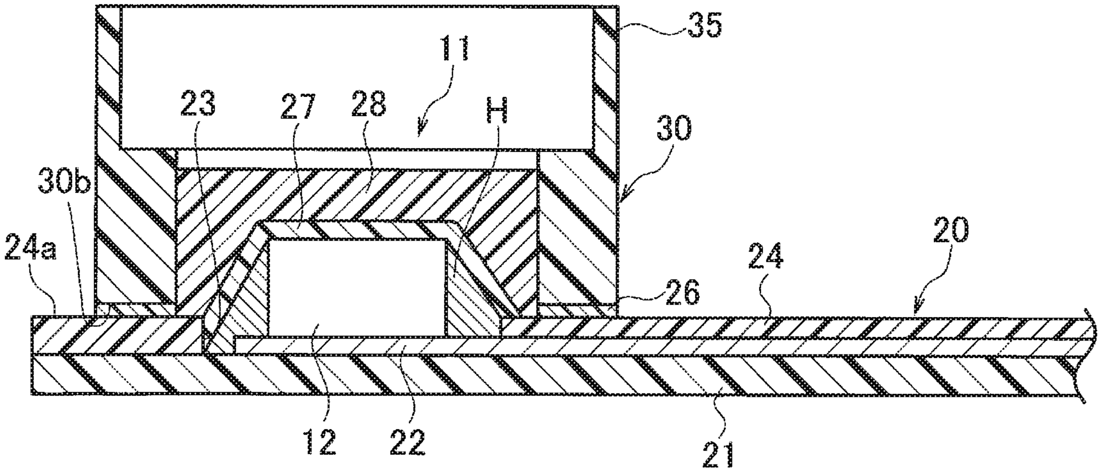
FIG. 12 is a cross-sectional view illustrating a state in which an adhesive such as moisture-proof material is filled in the resin case, the resin case which is fixed to the flexible printed wiring board according to the third embodiment.

FIG. 9 is a side view including a partial sectional view of a mounting structure of a temperature sensor according to a third embodiment; FIG. 10A is a perspective view illustrating a state before assembling the temperature sensor according to the third embodiment; FIG. 10B is a perspective view illustrating a state after assembling the temperature sensor according to the third embodiment; FIG. 11 is a cross-sectional view illustrating a state before securing a resin case arranged on a periphery of the temperature measuring component of the flexible printed wiring board according to the third embodiment; and FIG. 12 is a cross-sectional view illustrating a state in which an adhesive such as moisture-proof material is filled in the resin case, the resin case which is fixed to the flexible printed wiring board according to the third embodiment.

As illustrated in FIG. 9, a mounting structure 10 of a temperature sensor 11 according to the third embodiment is a mounting structure attached to a flexible thin plate-like electric-wire 20 to detect temperature of a battery cell S in a battery pack (battery module) M in which a plurality of battery cells S such as lithium batteries are connected in series or in parallel. The mounting structure 10 of the temperature sensor 11 includes a flexible printed wiring board 20 as a flexible thin plate-like electric-wire, a chip NTC thermistor (chip-shaped temperature measuring component) 12 soldered on an exposed part (conductor exposed part) 23 of wiring patterns 22 formed on the flexible printed wiring board 20 (soldered part is indicated by the symbol H in FIG. 9), and a rectangular cylindrical case 30 made of synthetic resin which is arranged around the exposed part 23 of the wiring pattern 22 for the flexible printed wiring board 20 and surrounds the chip NTC thermistor 12.

As illustrated in FIGS. 10A to 12, the flexible printed wiring board 20 is manufactured by forming two wiring patterns (conductors) 22 in parallel with a conductive metal such as copper foil on a thin and flexible base film 21 having insulation such as polyimide and by bonding a film-like cover 24 such as polyimide except for a part of the exposed portion 23 on the thin and flexible base film 21.

As illustrated in FIGS. 9 and 10B, the chip NTC thermistor 12 is soldered to the exposed portion 23 of the two wiring patterns 22 so as to straddle the two wiring patterns 22 of the exposed portion 23 (the part indicated as H in the drawings). Further, as illustrated in FIGS. 11 and 12, the rectangular cylindrical case 30 made of synthetic resin is arranged on the surface 24*a* surrounding the part on the flexible printed wiring board 20 where the chip NTC thermistor 12 is mounted, and the surface 24*a* of the flexible printed wiring board 20 and the bottom surface 30*b* of the rectangular cylindrical case 30 made of a synthetic resin are fixed by a double sided adhesive tape 26.

As illustrated in FIG. 12, the chip NTC thermistor 12 is coated with a moisture-proof material 27 in the rectangular cylindrical case 30 made of a synthetic resin, and an adhesive 28 as a resin material is applied and filled on the moisture-proof material 27.

The rectangular cylindrical case 30 made of synthetic resin of the temperature sensor 11 configured as described above is pressed against the battery cell S side via the biasing unit 40, as illustrated in FIG. 9, and a part of the flexible printed wiring board 20, where the chip NTC thermistor 12 is mounted, comes in contact with the battery cell S.

The biasing unit 40 includes a spring retainer 41 made of synthetic resin configured to engaging or disengaging the respective engage part 42 with respective lock receiving portion 61 having an inverse-concave-shaped formed to face each other on a holder 60 on the battery cell S side, and a compression coil spring (elastic member) 43 which is held by the spring retainer 41 and press-biases the rectangular cylindrical case 30 made of a synthetic resin toward the battery cell S side.

The battery pack M is a battery pack mounted on a vehicle such as an electric vehicle (EV), a hybrid electric vehicle (HEV) or a plug-in hybrid electric vehicle (PHEV) or the like and is used as a drive source. Further, the compression coil spring 43 is held by the holding shaft part 41*a* of the spring retainer 41 so as not to come off. Moreover, a box-like spring accommodating and holding part 35 is integrally molded on the upper surface of the case 30.

As described above, the mounting structure 10 of the temperature sensor 11 according to the first embodiment is capable of making the entire mounting structure to be thin, compact, and lightweight, and can be mounted onto the battery cell S to detect temperature with space saving, since the flexible printed wiring board (FPC) 20 is employed as the voltage detection line (electric wire) connected to a battery monitoring unit (not shown) that monitors the voltage of the battery cell S of the battery pack M and since the chip NTC thermistor 12 is coated and/or laminated with the moisture-proof material 27 and the adhesive 28 in the rectangular cylindrical case 30 made of synthetic resin surrounding the chip NTC thermistor 12 soldered on the exposed part 23 of the wiring pattern 22 of the flexible printed wiring board (FPC) 20.

When the flexible printed wiring board 20 is connected to the battery monitoring unit, the wiring pattern 22 of the flexible printed wiring board 20 can be connected to the battery monitoring unit. Therefore, a connector for connecting with coated electric wire is not necessary. Accordingly, cost reduction can be achieved by reducing the number of components.

The temperature sensor 11 made compact and thin is capable of minimizing its contact area and can reduce its heat capacity, since the temperature sensor 11 is pressed downward via the rectangular cylindrical case 30 made of synthetic resin and contacts the upper surface of the battery cell S by the elastic force of the compression coil spring 43 held by the spring retainer 41 that locks the lock part 42 to the lock receiving portion 61 of the holder 60 on the battery cell S. Thereby, a heat capacity can be reduced, and temperature measurement performance can be improved.

Furthermore, by using the chip NTC thermistor 12 mounted by soldering on the wiring pattern 22 exposed at the conductor exposed part 23 of the flexible printed wiring board 20, it is possible to easily secure improvement in the temperature measurement performance and insulation. In particular, the moisture-proof material 27 or the adhesive resin material 28 can be applied or filled in a leak-proof manner and can easily and reliably prevent the moisture-proof material 27 and the adhesive resin material 28 from spreading, since the periphery of the soldered part H of the chip NTC thermistor 12 is firmly fixed by the double sided adhesive tape 26. Thereby, the periphery of the soldered portion H of the chip NTC thermistor 12 can be sealed to ensure insulation.

Figure 13:
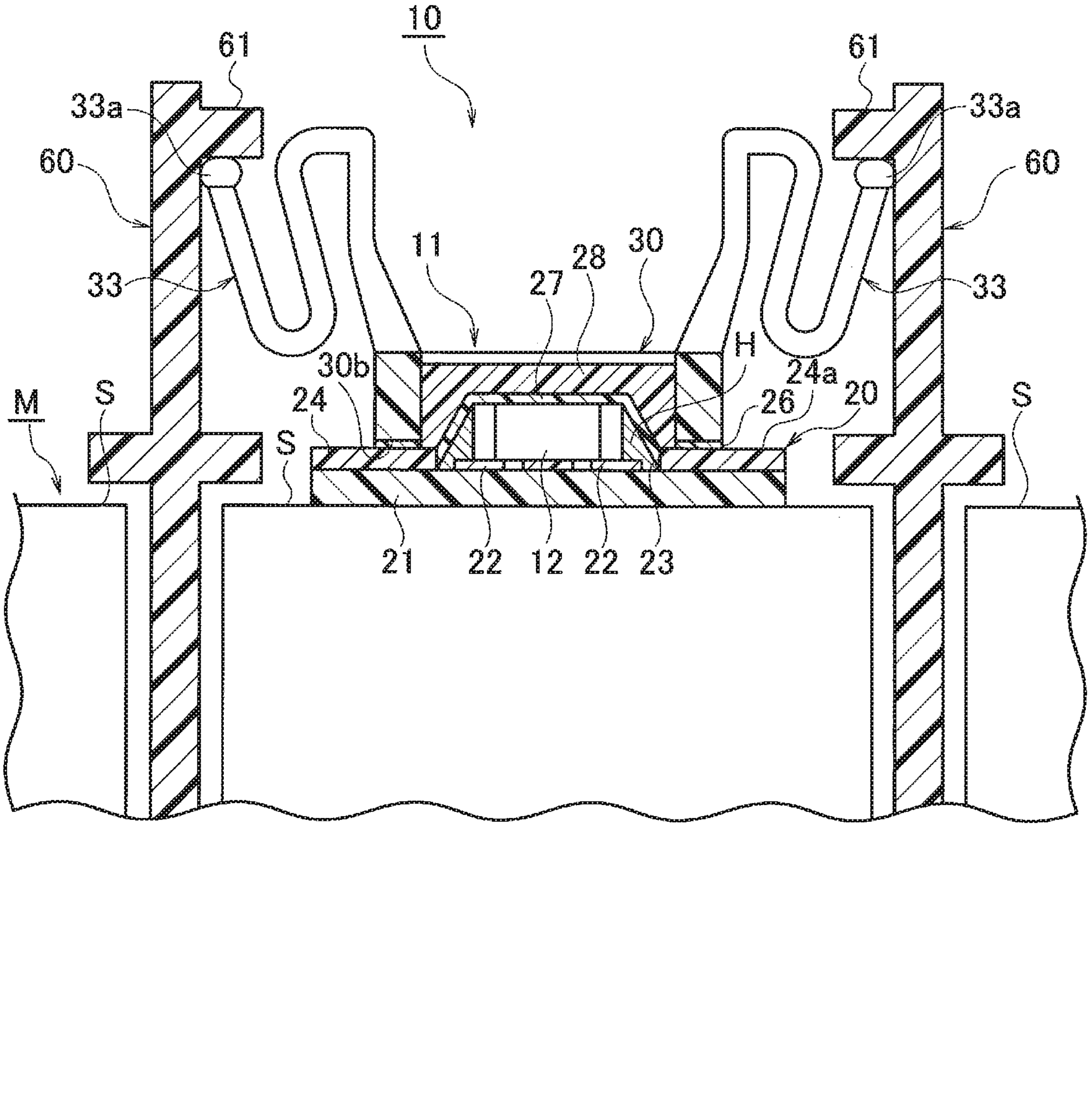
FIG. 13 is aside view including a partial sectional view of a mounting structure of a temperature sensor according to a fourth embodiment.
Figure 14:
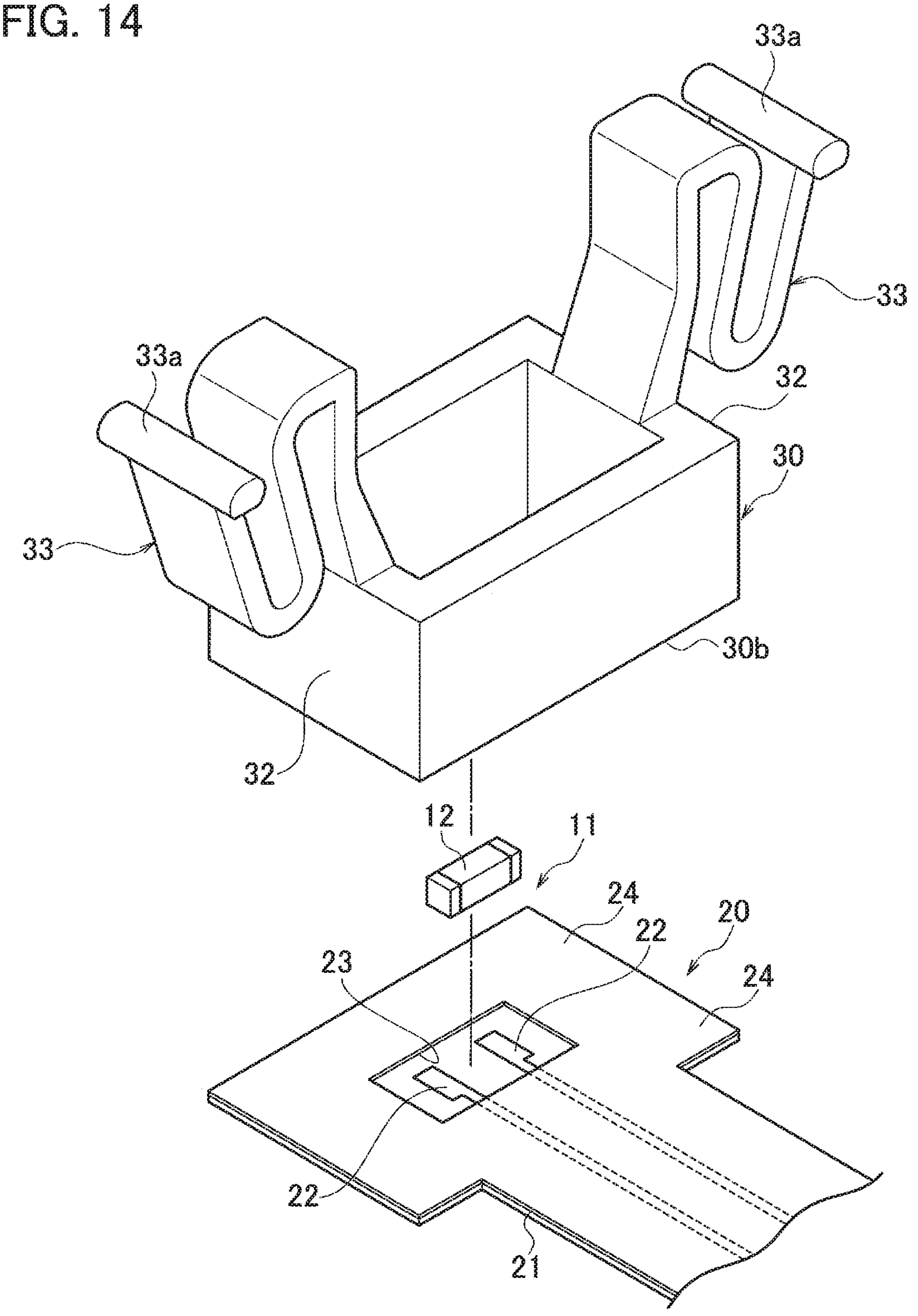
FIG. 14 is a perspective view illustrating a state before assembling the temperature sensor according to the fourth embodiment.

FIG. 13 is a side view including a partial sectional view of a mounting structure of a temperature sensor according to a fourth embodiment; and FIG. 14 is a perspective view illustrating a state before assembling the temperature sensor according to the fourth embodiment.

The mounting structure 10 of the temperature sensor 11 according to a fourth embodiment is different from the mounting structure of the third embodiment in that a pair of arm-like elastic parts (elastic members) 33 engaged with the respective lock receiving portions 61 of the pair of holding members 60 are formed to protrude from the upper surface of a pair of side wall parts 32 of the case 30 as a single piece. Since the other configurations are the same as that of the third embodiment, the same components are denoted with the same reference numerals and the detailed description will be omitted.

In the mounting structure 10 of the temperature sensor 11 of the fourth embodiment, distal end portions of the pair of arm-like elastic parts 33 formed of the case 30 are engaged with the lock receiving portion 61 of the holder 60, whereby the case 30 is pressed to the battery cell S side by the bending deformation of the arm-like elastic parts 33 and a part of the flexible printed wiring board 20, where the chip NTC thermistor 12 is mounted, contacts the battery cell S. Thereby, the same operation and effect as the third embodiment can be obtained.

Further, since the arm-like elastic parts 33 of the case 30 has a function as an elastic member, the number of components is reduced accordingly, and cost reduction can be achieved. Furthermore, since the case 30 has both the effects of fixing the flexible printed wiring board 20 and restricting the spread of the moisture-proof material 27 and the adhesive 28, the part of the flexible printed wiring board 20 where the chip NTC thermistor 12 is mounted can be reduced in size and thickness.

In each of the above embodiments, a flexible printed wiring board (FPC) is employed as a flexible thin plate-like electric-wire. However, a flexible flat cable (FFC) or the like may also be employed as a flexible thin plate-like electric-wire.

Further, in each of the above embodiments, chip NTC thermistor having a negative temperature coefficient (a component whose resistance decrease as temperature rises) is employed as a chip-shaped temperature measuring component. However, chip PTC thermistor (a component whose resistance increases as temperature rises), chip CTR thermistor or the like may also be employed as a chip-shaped temperature measuring component.

Furthermore, in each of the above-described embodiments, the compression coil spring is employed as an elastic member for biasing the temperature sensor toward the battery cell side. However, the elastic member is not limited to the compression coil spring. Other elastic members such as a leaf spring, a rubber material or the like may also be employed.

Figure 15:
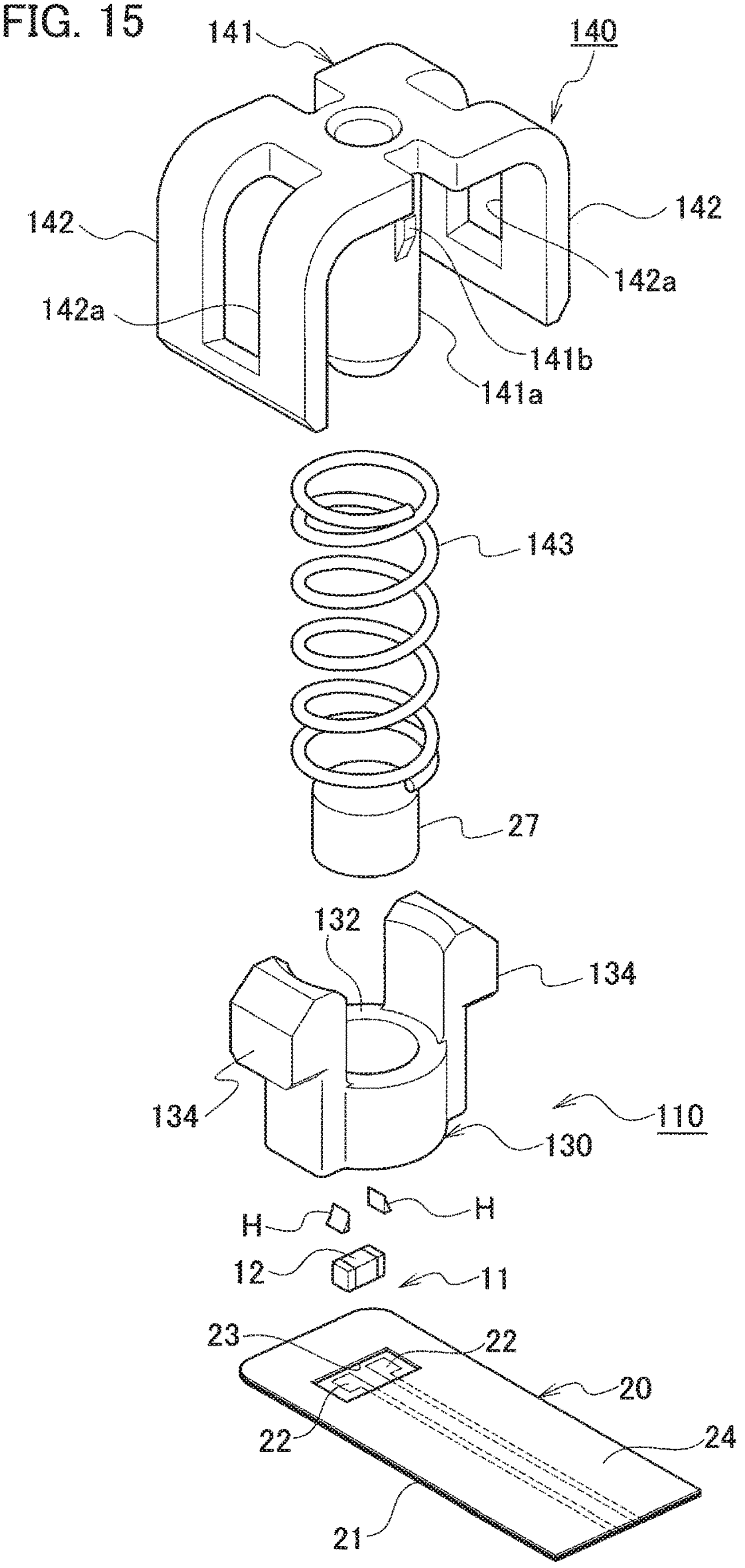
FIG. 15 is a perspective view illustrating a state before assembling a mounting structure of a temperature sensor according to the fifth embodiment.
Figure 16:
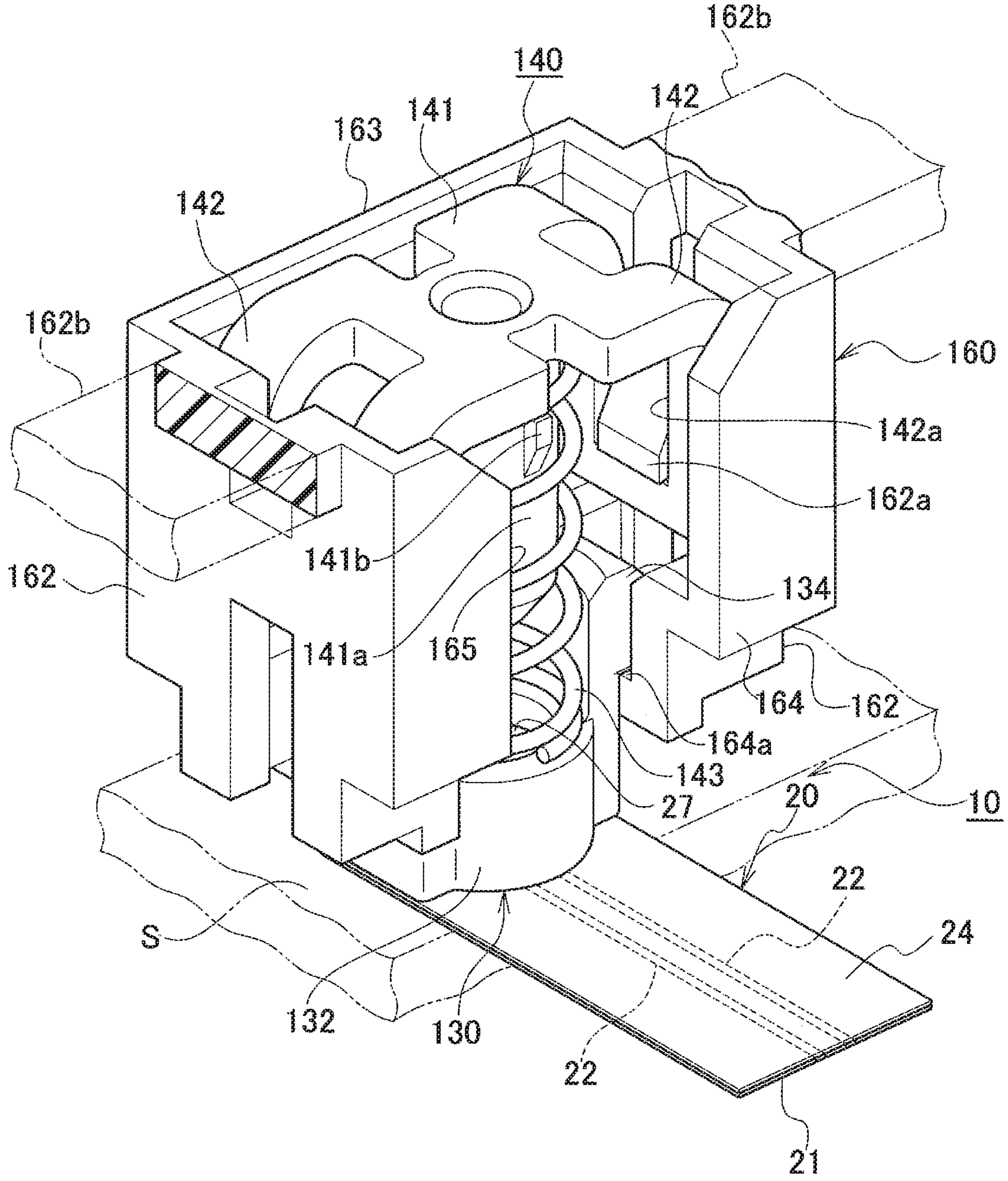
FIG. 16 is a perspective view illustrating the mounting structure of a temperature sensor according to the fifth embodiment.

FIG. 15 is a perspective view illustrating a state before assembling a mounting structure of a temperature sensor according to the fifth embodiment; and FIG. 16 is a perspective view illustrating the mounting structure of a temperature sensor according to the fifth embodiment.

The mounting structure 110 of the temperature sensor 11 according to the fifth embodiment is different from the mounting structure of the third embodiment in that the mounting structure 110 includes: a cylindrical case 130 which is arranged on the surface surrounding the part on the flexible printed wiring board 20 where two wiring patterns 22 at an exposed part (conductor exposed part) 23, surrounds a chip NTC thermistor 12 of a temperature sensor 11, and function as a holder; a biasing unit 140 made of synthetic resin which bias the case 130 against a battery cell S; and a holder 160 arranged on the battery cell S to lock the case 130 and the biasing unit 140.

As illustrated in FIGS. 15 and 16, a case main body 132 of the case 130 is formed of synthetic resin in a cylindrical shape, and the case 130 further includes a pair of L-shaped flexible locking protrusions 134 that are locked and released (engaged and disengaged) in locking recesses 164 formed on the holder 160 described later on both sides of the case 130. Moreover, the case body 132 of the case 130 is fixed around the exposed portion 23 of the flexible printed wiring board 20 via an adhesive, a double sided adhesive tape, or the like, and is filled with a moisture-proof material 27 to coat the chip NTC thermistor 12.

As illustrated in FIGS. 15 and 16, the biasing unit 140 includes a spring retainer 141 engaged and disengaged with a lock projection 162*a* formed on a holding member 160 described later, and a compression coil spring (elastic member) 143 held by the spring retainer 141 and biasing the case 130 toward the battery cell S.

As illustrated in FIG. 15, the spring retainer 141 has a cylindrical holding shaft part 141*a* in which a rib 141*b* is formed to protrude on a circumferential surface at a lower side of the center. The compression coil spring 143 is mounted to the holding shaft part 141*a* and is held by the rib 141*b* so as not to come off. Furthermore, on both sides of the spring retainer 141, a pair of flexible lock arm parts 142 are provided in parallel to the holding shaft portion 141*a*. A lock hole (a locked part) 142*a* in which the lock protrusion 162*a* of the holder 160 is locked, is formed on each lock arm part 142.

As illustrated in FIG. 16, the holder 160 is formed in a substantially rectangular cylindrical shape by both side wall parts 162, a rear wall part 163, and a front wall part 164 having an opening 165 at the center. In both side wall parts 162 of the holder 160, L-shaped flexible lock protrusions (lock parts) 162*a* which are fitted in the respective lock holes 142*a* of the pair of lock arms 142 of the spring retainer 141 are formed by cutting out each side wall parts 162.

Further, on the inner surface side of both sides of the opening part 165 on the front wall part 164 of the holder 160, locking concave parts (other lock parts) where the pair of lock protrusions 134 of the case 130 are engaged and disengaged are formed in a step shape. The other configuration of the flexible printed wiring board 20 and the like is the same as that of the third embodiment, so the same reference numerals are given to the same components and the detailed description will be omitted.

In the mounting structure 110 of the temperature sensor 111 according to the fifth embodiment, first, the compression coil spring 143 is mounted onto the holding shaft part 141*a* of the spring retainer 141 of the biasing unit 140, and lock the pedestal part of the compression coil spring 143 is locked in a gap in the upper part of the rib 141*b* of the holding shaft part 141*a*, and the compression coil spring 143 is held so as not to come off the holding shaft portion 141*a*. The spring retainer 141 and the compression coil spring 143 are integrated, and at the final assembly, the lock hole 142*a* formed on the lock arm part 142 of the spring retainer 141 and the lock protrusion of the holder 160 positioned on the battery cell S are locked. As a result, the final assembly is completed with a simple operation of locking the lock protrusion 162*a* of the holder 160 to the lock hole 142*a* formed on the lock arm part 142.

As described above, the temperature sensor 111 can be mounted to the battery cell S in a space-saving manner, and the thickness, size, and weight of the entire mounting structure can be further reduced by employing the thin and small biasing unit 140 capable of holding the compression coil spring 143 so as not to come off the holding shaft part 141*a* of the spring retainer 141.

Furthermore, since the lock hole 142*a* of the flexible lock arm part 142 of the spring retainer 141 is fitted into the inward locking protrusion 162*a* of the holder 160 positioned on the battery cell S, and the biasing unit 140 and the holder 160 are locked to each other, rattling of the biasing unit 140 housed between the side walls 162 of the holder 160 can also be absorbed. As a result, a mounting structure 110 of the temperature sensor 111 with high accuracy is provided.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A mounting structure of a temperature sensor configured to detect temperature of a battery cell included in a battery pack having a plurality of battery cells being connected by mounting on the battery cell, the mounting structure comprises:

a flexible thin plate-like electric wire including a conductor exposed part where a conductor is exposed;

a chip-shaped temperature measuring component having a first surface, mounted on and directly facing the conductor exposed part, and a second surface that is opposite to the first surface and facing away from the conductor exposed part;

a resin case arranged on a periphery of the conductor exposed part and surrounding the temperature measuring component; and a moisture-proof material coating the temperature measuring component arranged in the resin case;

a resin material arranged directly on the moisture-proof material arranged in the resin case; and one or more elastic members, wherein the resin case comprises a plurality of projections projected, in a direction in which the second surface is facing, away from the temperature measuring component and onto which the one or more elastic members bias, in a direction from the first surface to the second surface, the resin case towards the temperature measuring component.

2. The mounting structure of the temperature sensor according to claim 1, wherein a peripheral surface of the conductor-exposed part on the flexible thin plate-shaped electric-wire and a bottom surface of the resin case are fixed by a double sided adhesive tape.

3. The mounting structure of the temperature sensor according to claim 1, wherein a peripheral part of the conductor-exposed part on the flexible thin plate-shaped electric- wire is sandwiched and fixed between bottom surface of the resin case and a surface of a support member configured to be locked or released to the resin case.

4. The mounting structure of the temperature sensor according to claim 1, wherein the resin case is biased toward the battery cell via a biasing unit and a temperature-measuring-component mounted part of the flexible thin plate-shaped electric-wire is in contact with the battery cell, wherein the biasing unit comprises the one or more springs.

5. The mounting structure of the temperature sensor according to claim 4, wherein the biasing unit includes:

an elastic member retainer configured to be locked or released to a holder on the battery cell, and an elastic member held by the elastic member retainer and configured to bias the resin case against the battery cell, and wherein one of the one or more springs is the elastic member.

6. The mounting structure of the temperature sensor according to claim 1, wherein the resin case is biased toward the battery cell via an elastic member and a temperature-measuring-component mounted part of the flexible thin plate-shaped electric-wire is in contact with the battery cell, wherein one of the one or more springs is the elastic member.

7. The mounting structure of the temperature sensor according to claim 6, wherein the elastic member is an arm-shaped elastic part integrally molded and protruding from the resin case.

8. The mounting structure of the temperature sensor according to claim 4, the mounting structure further comprises a biasing unit that biases the resin case against the battery cell, wherein the biasing unit includes:

an elastic member retainer having a locked part configured to be locked or released to a first lock part formed on the holder on the battery cell, and an elastic member held by the elastic member retainer and configured to bias the resin case against the battery cell, wherein the biasing unit comprises the one or more springs, and wherein the elastic member is one of the one or more springs.

9. The mounting structure of the temperature sensor according to claim 8, wherein the resin case includes a lock protrusion configured to be locked or released to a second lock part formed on the holder.

10. The mounting structure of the temperature sensor according to claim 1, wherein the conductor exposed part comprises a portion of the flexible thin plate-like electric wire where a cavity is formed by an absence of an insulator of the flexible thin plate-like electric wire, and wherein portions of each of the chip-shaped temperature measuring component and the moisture-proof material are arranged in the cavity.

11. The mounting structure of the temperature sensor according to claim 1, wherein the resin material is arranged inside of the resin case, the resin material is arranged directly on a part of the moisture-proof material, the part of the moisture-proof material is between the resin case and a part of the chipshaped temperature measuring component, and the part of the chip-shaped temperature measuring component is facing opposite from a connection between the chip-shaped temperature measuring component and the conductor.

12. The mounting structure of the temperature sensor according to claim 1, wherein the resin material is an adhesive other than the resin case.

13. The mounting structure according to claim 1, wherein first portions of the resin material are in direct contact with the resin case and second portions of the resin material are exposed to an inner cavity of the resin case without contact to the resin case and without contact to the moisture-proof material.

14. The mounting structure according to claim 1, wherein the one or more elastic members comprise a coil spring.

15. The mounting structure according to claim 1, wherein the one or more elastic members each comprise s-shaped portions that, at first ends thereof opposite to second ends thereof in direct contact with the resin case, that are projected outward from the resin case in a second direction that is perpendicular to the direction from the second surface to the first surface.

* * * * *